United States Patent
Amirat et al.

(10) Patent No.: US 9,568,194 B2
(45) Date of Patent: Feb. 14, 2017

(54) BURNER ASSEMBLY AND METHOD OF COMBUSTION

(75) Inventors: Mohand Amirat, Gas (FR); Pascal Duperray, Montigny le Bretonneux (FR); Benoit Grand, Versailles (FR); Magnus Mortberg, Frankfurt am Main (DE); Jacques Mulon, Massy (FR); Xavier Paubel, Chatenay Malabry (FR); Rémi Tsiava, Saint Germain-les-Corbeil (FR); Robert Kalcevic, Versailles (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 1803 days.

(21) Appl. No.: 13/003,021

(22) PCT Filed: Jul. 1, 2009

(86) PCT No.: PCT/EP2009/058293
§ 371 (c)(1),
(2), (4) Date: Jan. 31, 2014

(87) PCT Pub. No.: WO2010/003866
PCT Pub. Date: Jan. 14, 2010

(65) Prior Publication Data
US 2016/0047546 A1 Feb. 18, 2016

(30) Foreign Application Priority Data
Jul. 8, 2008 (EP) .................................... 08305386

(51) Int. Cl.
*F23D 14/22* (2006.01)
*F23N 1/02* (2006.01)
(Continued)

(52) U.S. Cl.
CPC ................ *F23N 1/02* (2013.01); *F23D 14/22* (2013.01); *F23D 14/32* (2013.01); *F23D 14/84* (2013.01);
(Continued)

(58) Field of Classification Search
USPC ....................................... 431/8, 181, 159, 12
See application file for complete search history.

(56) References Cited

U.S. PATENT DOCUMENTS 5,020,566 A * 6/1991 Shoop ................ F02M 37/0023
137/192
5,199,866 A 4/1993 Joshi et al.
(Continued)

OTHER PUBLICATIONS

International Search Report for Patent Application No. PCT/EP2009/058293 mailed Sep. 25, 2009.

*Primary Examiner* — Avinash Savani
(74) *Attorney, Agent, or Firm* — Christopher J. Cronin (57) ABSTRACT

Variable momentum burner assembly for separately injecting fuel gas and oxidant in a combustion zone, comprising at least two fuel gas canals, at least one oxidant canal and a fuel gas distributor, whereby the at least two fuel gas canals comprise an inner fuel-conducting passage forming an inner fuel gas outlet and an outer fuel-conducting passage forming an outer fuel gas outlet, said inner and said outer fuel-conducting passages being coaxially arranged; and whereby said fuel gas distributor comprises a first fuel gas chamber in fluid connexion with the inner fuel-conducting passage of the at least two fuel gas canals and a second fuel gas chamber in fluid connexion with the outer fuel-conducting passage of the at least two fuel gas canals.

13 Claims, 7 Drawing Sheets

(51) Int. Cl.
*F23D 14/32* (2006.01)
*F23N 1/00* (2006.01)
*F23D 14/84* (2006.01)

(52) U.S. Cl.
CPC ............... *F23D 91/02* (2015.07); *F23N 1/007* (2013.01); *F23D 2200/00* (2013.01); *F23N 2037/08* (2013.01); *Y02E 20/344* (2013.01)

(56) References Cited

U.S. PATENT DOCUMENTS

| | | |
|---|---|---|
| 5,302,112 A | 4/1994 | Nabors, Jr. et al. |
| 5,743,723 A | 4/1998 | Iatrides et al. |
| 5,894,667 A | 4/1999 | Van Den Hout |
| 5,984,667 A | 11/1999 | Philippe et al. |
| 6,068,468 A | 5/2000 | Philippe et al. |
| 6,074,197 A | 6/2000 | Philippe |
| 2003/0157450 A1 | 8/2003 | Joshi et al. |
| 2008/0131827 A1 | 6/2008 | Birle et al. |

* cited by examiner

BURNER ASSEMBLY AND METHOD OF COMBUSTION

CROSS-REFERENCE TO RELATED APPLICATIONS

This application is a §371 of International PCT Application PCT/EP2009/058293, filed Jul. 1, 2009, which claims §119(a) foreign priority to European Patent application 08305386.8, filed Jul. 8, 2008.

BACKGROUND

Field of the Invention

The present invention relates to a combustion process and an apparatus therefor containing separate fuel and oxidant injectors to introduce fuel gas and oxidant separately in the combustion chamber of a furnace, so that the fuel burns with the oxidant in a wide luminous flame, and whereby the combustion of the fuel with the oxidant generates reduced quantities of nitrogen oxides (NOx).

Related Art

Industrial high temperature processes, such as glass or frit melting, ferrous and non ferrous materials smelting, use large amounts of energy to transform a variety of raw materials into a hot product that is then cast, formed or otherwise disposed of in further stages of the industrial process. This operation is generally performed in large furnaces that can produce as much as 500 tons (metric) per day of molten material. Combustion in the furnace of high calorific value fuels, such as natural gas, propane, or possibly low calorific fuels such as some blast furnace gasses, with an oxidant that contains oxygen is a preferred method of supplying the energy. In some cases, the combustion is supplemented by electric heating. Most of the time, fuel and oxidant are introduced in the furnace through burners in order to generate flames. The transfer of energy from the flames to the material to be heated or melted results from the combination of convection at the surface of the material and radiation to the surface or into the material, if the material is transparent to the radiation. Flames that are highly radiative (usually referred to as luminous flames) are usually preferred, because they provide better heat transfer and, thus, higher fuel efficiency.

For flame heating, it is also very important to have the energy from the flame evenly distributed above the surface of the material to be heated or melted. Otherwise, hot and cold regions may co-exist in the furnace, which is generally not desirable as it may affect the quality of products manufactured with material heated or melted in such a furnace. For example, in a bath of molten glass, there may be glass stones in cold regions, and increased volatilization in hot regions. Wide flames are preferred because they yield a better and more even coverage.

In many countries, increasingly stringent regulations are being promulgated regarding emissions of NOx. Combustion techniques wherein NOx formation is limited have therefore been developed.

In very high temperature processes, NOx formation is promoted by long residence times of oxygen and nitrogen molecules in hot regions of the flame and the furnace. The use of substantially pure oxygen (90% O2 or higher) instead of air as the oxidant has proven to be very successful in reducing the NOx emissions by as much as 90%, since nearly all nitrogen is eliminated.

However, substitution of air by substantially pure oxygen increases the flame temperature, and thus creates regions in the furnace where the reactivity of nitrogen with oxygen is high, and wherein the formation of NOx may proportionally increase, even though it is globally decreased when compared to combustion with air. Indeed, it is, in practice, usually impossible to eliminate all nitrogen from a furnace, because industrial furnaces are not tight to air leaks, the fuel usually contains some nitrogen, and oxygen supplied from non-cryogenic sources, such as oxygen produced by a Vacuum Swing Adsorption plant (VSA), contains a small residual nitrogen concentration.

Burner assemblies capable of operating at low pressure, particularly for the oxidant gas, while producing a wide, flat luminous flame with reduced NOx emissions, and which afford a manner of controlling flame length so as to adapt the flame to the furnace in which they are used are known from U.S. Pat. Nos. 5,984,667 and 6,068,468, and are commercialized by the applicant under the commercial denominations Alglass™ FC and Albatch™ FC.

An essential aspect of said burner assembly is that the fuel and oxidant are physically separated (i.e. spaced apart), and geometrically arranged in order to impart to the fuel fluid streams and the oxidant fluid streams angles that allow combustion of the fuel fluid with the oxidant in a stable, wide, and luminous flame.

More specifically, U.S. Pat. No. 5,984,667 discloses a burner assembly comprising at least two fuel fluid cavities, at least one oxidant fluid cavity and at least one exit face at which at least one of the fuel fluid cavities and at least one of the oxidant fluid cavities terminates. Said burner assembly comprises:

a) means for supplying an oxidant fluid stream;
b) means to inject said oxidant fluid stream in said at least one oxidant fluid cavity to create at least one injected oxidant fluid stream;
c) means for supplying a fuel fluid stream; and
d) means to inject said fuel fluid stream in said at least two fuel fluid channels to create at least two injected fuel fluid streams;
whereby the directions of injection of the oxidant fluid stream and the fuel fluid stream are substantially converging and intersect at a combustion zone, while the directions of at least two adjacent fuel fluid channels are diverging.

Demonstrated benefits of this type of burners are:
improvements in fuel efficiency by directing the flame energy towards the charge rather than towards the furnace structure,
improvements in heating uniformity and elimination of hot spots through enhanced charge coverage,
high luminosity resulting in efficient heat transfer to the charge, e.g. in glass melting furnaces,
low pollutant emissions.

Burners of this type operate reliably under a certain range of process conditions, in particular within a certain range of firing rates, but problems may arise when the burner is operated outside said range. For example, a problem experienced with burners of this type is that at low firing rates (e.g. below 30% of the nominal firing rate) the flame produced by the burner is 'lazy' and tends to lift towards the crown of the furnace, thereby increasing the risk of hot spot formation in the furnace crown. At very high firing rates (e.g. more than 200% of the nominal firing rate, flame control becomes increasingly difficult and the length of the flame may be such as to cause damage to the opposite furnace wall.

There exists a need to increase the flexibility of the above known type of burner.

In glass-melting furnaces, by way of example, the pull rate of the furnace may have to be increased, which generally entails an increase in the firing rate of at least one of the burners mounted in the furnace. Under certain circumstances, it may also be necessary to decrease the pull rate of the furnace, which may entail a decrease in the firing rate of at least of its burners. It would be desirable to provide more flexibility in the firing rate of the furnace without deterioration of the quality of the product produced in the furnace and without substantially accelerating or increasing the risk of furnace damage.

It is an object of the present invention to provide burner assemblies and methods of combustion which reliably present the benefits of the above known type of burners over a wider range of process conditions and in particular of firing rates.

Burners jointly injecting fuel and oxidant (i.e. fuel and oxidant injection which is not spaced apart as opposed to separate injection) and capable of operating at both high and low momentum are known in the art.

EP-A-0563793 discloses a variable-momentum oxy-fuel combustion system comprising an oxy-fuel burner having a generally cylindrical housing with a fuel conduit disposed in spaced relation to and concentrically within said housing, whereby:
  the fuel conduit is co-extensive along a major portion of said housing and has a flame end terminating in the same plane as the flame end of said housing;
  a fuel cap is disposed concentrically within the fuel conduit, said fuel cap and said fuel conduit cooperating to produce an annular fuel flow at said flame end of said housing;
  an oxidizer conduit is disposed concentrically within said housing between said fuel conduit and said housing, said oxidizer conduit extending coexistively in said housing;
  a precombustor is mounted on said burner;
and whereby:
  the fuel conduit is adapted for variable positioning relative to said oxidizer conduit along the longitudinal axis including a position where they terminate in the place defined by the flame end of said housing to define an annular oxidizer passage orifice surrounding said fuel conduit; and
  the fuel conduit and said fuel cap adapted for variable positioning relative to each other along the longitudinal axis including a position where they terminate in the place defined by the flame end of said housing to define an annular fuel passage means to introduce fuel to said fuel passage and oxidizer to said oxidizing passage.

A major inconvenience of the variable-momentum combustion system according to EP-A-0563793 is that the momentum of the oxy-fuel flame is varied by varying the position of constituent parts of the assembly, such as the fuel conduit, the oxidizer conduit and/or the fuel cap proximate the flame end of the housing. The presence, in the assembly, of moveable parts at a point where they are subjected to the effects of the oxy-fuel flame, such as high temperatures and possibly deposits of combustion products or volatilized material, affects the reliability of said combustion system in operation.

EP-A-763692 discloses an oxy-fuel burner including an outer oxidant tube, an intermediate fuel tube and an inner oxidant tube which are coaxially arranged with the fuel tube disposed between the inner and outer oxidant tubes and whereby the characteristics of the flame produced by the burner may be controlled by varying the relative flow rates of the inner and outer oxidant flows. An increase in the percentage of the total oxidant which is provided to the inner oxidant tube causes the length and luminosity of the flame to decrease and the flame momentum to increase. Burners of this type are commercialized by the applicant under the commercial denominations Alglass™ VM and Albatch™ VM.

Benefits of this burner technology as demonstrated in glass-melting furnaces are:
  possibility to regulate the atmosphere in the furnace,
  possibility to regulate the momentum of the flame, in particular in the case of oxy-boosting,
  possibility to adjust the flame length according to furnace geometry (furnace width in the case of cross-firing), and
  possibility to modify the flame luminosity according to the type of charge (glass composition).

Neither of the above known variable momentum combustion technologies for joint injection of fuel and oxidant are adapted for use in burner assemblies of the type known from U.S. Pat. Nos. 5,984,667 and 6,068,468, which comprise at least two fuel passages and whereby fuel and oxidant gas are injected in separate fluid streams into a combustion chamber of a high temperature furnace.

SUMMARY OF THE INVENTION

In accordance with the present invention, there is provided a burner assembly comprising at least two fuel fluid canals and at least one oxidant fluid canal and whereby the directions of injection of the oxidant fluid stream and the fuel fluid stream are substantially converging and intersect at a combustion zone downstream of the burner assembly.

According to the invention, the burner assembly comprises:
  at least two fuel gas canals;
  at least one oxidant canal; and
  at least one exit face at which the at least two fuel gas canals or at least one of the oxidant canals or both terminate, The burner assembly of the invention further comprises:
a) means for supplying an oxidant stream;
b) means to inject said oxidant stream in said at least one oxidant fluid canal to create at least one injected oxidant stream;
c) means for supplying a fuel gas stream;
d) means to inject said fuel gas stream in said at least two fuel gas canals to create at least two injected fuel gas streams.

The burner assembly is further designed so that the directions of injection of the at least one oxidant stream and the at least two fuel gas streams are substantially converging and intersect at a combustion zone downstream of the burner assembly.

The burner assembly is further characterized in that
  the at least two fuel gas canals comprise an inner fuel-conducting passage forming an inner fuel gas outlet and an outer fuel-conducting passage forming an outer fuel gas outlet, said inner and said outer fuel-conducting passages being coaxially arranged;
  the means to inject the fuel gas stream comprises a fuel gas distributor for receiving the fuel gas stream from the means for supplying a fuel gas stream, said fuel gas distributor having:
i) a first fuel gas chamber in fluid connexion with the inner fuel-conducting passage of the at least two fuel gas canals, whereby said first fuel gas chamber has a first inlet for receiving fuel gas supplied by the means for supplying a fuel gas stream;

ii) a second fuel gas chamber in fluid connexion with the outer fuel-conducting passage of the at least two fuel gas canals, whereby said second fuel gas chamber has a second inlet for receiving fuel gas supplied by the means for supplying a fuel gas stream; and iii) fuel gas flow control means for controlling the flow of the fuel gas stream from the means for supplying a fuel gas stream to respectively the first and second inlet.

The fuel gas distributor which has a first fuel gas chamber in fluid connexion with the inner fuel-conducting passage of the at least two fuel gas canals and a second fuel gas chamber in fluid connexion with the outer fuel-conducting passage of the at least two fuel gas canals makes it possible simultaneously, evenly and reliably to control the flow of fuel gas to all of the at least two fuel gas canals, and more specifically to respectively the inner and the outer fuel-conducting passages of said at least two fuel gas canals. As clarified in the examples below, by thus distributing the fuel gas stream over the inner and outer fuel-conducting passages, both the firing rate of the burner assembly and the flame length can be controlled.

The even and simultaneous control of the flow of fuel gas to the respective passages of the at least two fuel gas canals is of major importance when the burner assembly is used in industrial high temperature processes such as glass melting. Indeed, an uneven or timewise spaced apart control over the at least two fuel gas canals would result in a lasting or transitory change in the shape of the flame and in the heat profile of the combustion zone with possible consequences to the quality of the products obtained in the process or damage to the furnace.

The relative simplicity of the fuel gas distributor also enables a robust construction thereof. Furthermore, as the fuel gas distributor is situated on the low-temperature side of the burner assembly opposite and away from the combustion zone also adds to the reliability of the burner assembly in that the fuel gas distributor and any moving parts thereof are not subjected to the potentially deleterious effects of the high temperatures in the furnace nor to the formation of deposits of combustion products, condensed products or dust.

The present invention also relates to furnaces equipped with at least one burner assembly according to the present invention and to combustion processes in which a burner assembly according to the present invention is used to inject and combust fuel and oxidant in a combustion zone downstream of the burner assembly. Furnaces according to the present invention may in particular be melting furnaces, such as glass-melting furnaces or non-ferrous melting furnaces, such as aluminium melting furnaces.

According to the invention, the inner fuel-conducting passage of the at least two fuel gas canals may be mounted on the first fuel gas chamber or the outer fuel-conducting passage of the at least two fuel gas canals may be mounted on the second fuel gas chamber. Preferably, the inner fuel-conducting passages of the at least two fuel gas canals are mounted on the first fuel gas chamber and the outer fuel-conducting passages of the at least two fuel gas canals are mounted on the second fuel gas chamber. The at least two fuel gas canals and the at least one oxidant fluid canal are typically situated in a refractory block. The combustion zone is typically positioned in the interior of a furnace. The fuel gas distributor is advantageously situated partially or totally outside the refractory block. Such a position of the fuel gas distributor at the upstream side of the refractory block facilitates access to the fuel gas distributor.

According to an advantageous embodiment, the burner assembly has three fuel gas canals. Advantageous burner assemblies have at least five canals and in particular three fuel gas canals and two oxidant canals, whereby preferably, if the fuel gas canals are positioned in a lower portion of the burner assembly the oxidant canals are positioned in an upper portion thereof or vice versa.

For further details regarding different possible embodiments of the invention, and in particular the number of fuel gas canals, the number of oxidant fluid canals, their shape and orientation and the materials that can be used, reference is made to the abovementioned prior documents U.S. Pat. Nos. 5,984,667 and 6,068,468.

For ease of construction, the second fuel gas chamber preferably at least partially surrounds the first fuel gas chamber. The second fuel gas chamber may in particular totally surround the first fuel gas chamber.

Means for supplying a fuel gas stream typically comprise a fuel supply line connecting the burner assembly to a fuel source, whereby said fuel source may be a fuel reservoir, a fuel production unit or a further fuel supply line, for example a gas pipeline. It will be appreciated that in the fuel source, the fuel may be present in liquid form, even though in the burner assembly downstream of said fuel source the fuel is present in the form of a fuel gas stream (for example after having passed through an expander). Likewise, means for supplying an oxidant stream typically comprise an oxidant supply line connecting the burner assembly to an oxidant source, such as an oxidant reservoir, an oxidant production unit or a further oxidant supply line.

The fuel gas flow control means may comprise one or more valves capable of partially or wholly shutting the first and/or second inlets to achieve the effect of controlling the fuel gas stream flowing respectively through the first and second inlet.

These valves may be manually and/or automatically operated.

In the present context, the partial closure of an inlet is understood to mean a restriction of the opening of the inlet whereby the flow of gaseous fuel through the inlet is partially obstructed.

According to a preferred embodiment, the fuel gas flow control means is in particular equipped to selectively open or close, partially or totally, the inlet of the second fuel gas chamber.

The present invention makes it possible simultaneously and evenly to control the momentum of fuel gas through the at least two fuel canals, and more specifically through the inner and outer fuel-conducting passages of said canals, by controlling the flow of the fuel gas to the first inlet and thus into the first fuel gas chamber and the flow of the fuel gas to the second inlet and thus to the second fuel gas chamber.

According to the invention, the first fuel gas chamber and the second fuel gas chamber are in fluid connection with one another via one of the first and second inlets. The fuel supply means supplies the fuel gas stream to either the first or the second inlet of the fuel gas distributor, i.e. to the inlet of either the first or the second fuel gas chamber. According to this embodiment, the fuel gas flow control means is equipped to control the portion of the fuel gas stream flowing from the fuel gas chamber to which the fuel supply means supplies the fuel gas stream to the other fuel gas chamber through the inlet of said other fuel gas chamber. Typically, the fuel gas flow control means comprises a valve capable of partially or wholly closing the latter inlet for controlling the portion of the fuel gas stream flowing from the initial fuel gas chamber to the other fuel gas chamber, thus controlling simultaneously and evenly the proportions of the fuel gas stream injected respectively through the inner fuel-conducting passages of the at least two fuel gas canals and through the outer fuel-conducting passages of the at leas two fuel gas canals. According to the invention, the said valve may be manually and/or automatically operated.

Preferably, the fuel supply means supplies the fuel gas stream to the first inlet, i.e. to the inlet of the first fuel gas chamber, and the fuel gas flow control means is equipped to control the portion of the fuel gas stream flowing from the first fuel gas chamber into the second fuel gas chamber through the second inlet. The portion of the fuel gas stream flowing from the first fuel gas chamber into the second fuel gas chamber, is injected into the combustion zone via the outer fuel-conducting passages of the at least two fuel gas canals, the remainder of the fuel gas stream, which does not flow from the first fuel gas chamber into the second fuel gas chamber, is injected via the inner fuel-conducting passages of the at least two fuel gas canals.

Alternatively, the fuel supply means may supply the fuel gas stream to the second inlet, i.e. to the inlet of the second fuel gas chamber, and the fuel gas flow control system is equipped to control the portion of the fuel gas stream flowing from the second fuel gas chamber into the first fuel gas chamber through the first inlet. In this case, the portion of the fuel gas stream flowing from the second fuel gas chamber into the first fuel gas chamber is injected into the combustion zone via the inner fuel-conducting passages of the at least two fuel gas canals, the remainder of the fuel gas stream, which does not flow from the second fuel gas chamber into the first fuel gas chamber, is injected via the outer inner fuel-conducting passages of the at least two fuel gas canals.

In this case, the same fuel gas coming from the means for supplying a fuel gas stream is fed to both the first and second fuel gas chamber (or to only one of the fuel gas chambers, when the proportion of the fuel gas stream flowing from one chamber into the other chamber equals zero).

For example:
(a) when the fuel supply means supplies the fuel gas stream to the first inlet and thus to the first fuel gas chamber and when the fuel gas flow control means completely closes the second inlet into the second fuel gas chamber, the entire fuel gas stream is injected through the inner fuel-conducting passages of the at least two fuel gas canals; and
(b) when, on the other hand, said fuel gas flow control means leaves the second inlet into the second gas chamber partially or totally open, part of the fuel gas stream flows through the second inlet into the second fuel gas chamber, in which case, said part of the fuel gas stream which passes into the second fuel gas chamber is injected through the outer fuel-conducting passages of the at least two fuel canals and the remainder of the fuel gas stream, which does not pass into the second fuel gas chamber, is injected through the inner fuel-conducting passages of the at least two fuel gas canals.

The reverse is the case when the fuel supply means supplies the fuel gas stream to the second inlet.

For an identical flow of fuel gas from the means for supplying a fuel gas stream to the fuel gas distributor, the overall momentum with which the fuel gas is injected through the at least two fuel gas canals is higher in case (a), whereby all of the fuel gas is injected through the inner fuel-conducting passages, when compared to case (b), whereby part of the fuel gas is injected through the outer fuel-conducting passages and the remainder of the fuel gas through the inner fuel-conducting passages.

As mentioned before, the present invention also relates to furnaces comprising at least one burner assembly according to any one of the above embodiments of the present invention. Said furnaces may in particular be a melting furnace, such as a glass melting furnace or an aluminium melting furnace.

Another aspect of the invention is a method of combustion of a fuel with an oxidant using a burner assembly according to any one of the embodiments of the invention described above. Said method comprises
a) supplying an oxidant stream, said oxidant stream being supplied by the means for supplying an oxidant stream;
b) injecting said oxidant stream in the at least one oxidant fluid canal to create at least one injected oxidant stream;
c) supplying a fuel gas stream to the fuel gas distributor, said fuel gas stream being supplied by the means for supplying a fuel gas stream;
d) controlling the flow of the fuel gas stream to the first and second inlet; said flow of the fuel gas stream being controlled by the fuel gas flow control means;
e) injecting said fuel gas stream in said at least two fuel gas canals to create at least two injected fuel gas streams;
f) combusting the at least one injected oxidant stream and the at least two injected fuel gas streams in the combustion zone downstream of the burner assembly, where said injected at least one oxidant stream and the at least two injected fuel gas streams intersect.

The oxidant may consist of an oxidant such as air or oxygen-enriched air. The oxidant stream advantageously consists of an oxidant having an oxygen molar concentration of at least 50%, preferably of at least 80%, more preferably of at least 90% and most preferably of at least 95%. Such oxidants include oxygen-enriched air containing at least 50% vol. of oxygen, oxygen such as "industrially" pure oxygen (99.5%) produced by a cryogenic air separation plant or non-pure oxygen produced by e.g. a vacuum swing adsorption process (88% vol. O2 or more) or "impure" oxygen produced from air or any other source by filtration, adsorption, absorption, membrane separation, or the like, whereby the oxidant may be at room temperature or in preheated form.

In the case of a burner assembly of the invention whereby the fuel gas supply means supplies the fuel gas stream to one of the first and second inlets, and whereby the first and second fuel gas chambers are in fluid connection with one another via the other of the first and second inlets:
step c) of the method of combustion typically comprises supplying the fuel gas stream to one of the first and second fuel gas chambers via the inlet of said fuel gas chamber and:
the step d) of the method comprises:
d1) controlling the flow of the fuel gas stream supplied to said one of the first and second gas fuel chambers via the inlet of said fuel gas chamber, and
d2) controlling the portion of said fuel gas stream flowing from said one of the first and second fuel gas chambers to the other fuel gas chamber via the inlet of said other fuel gas chamber.

When, as described above, the means for supplying a fuel gas stream supplies the fuel gas stream to the first inlet (of the first fuel gas chamber), then step c) of said method of combustion comprises supplying the fuel gas stream to the first fuel gas chamber via the first inlet and step d) of the method comprises:

d1) controlling the flow of the fuel gas stream supplied to the first fuel gas chamber via the first inlet, and d2) controlling the portion of said fuel gas stream flowing from said first fuel gas chamber to the second fuel gas chamber via the second inlet.

Conversely, when the means for supplying a fuel gas stream supplies the fuel gas stream to the second inlet (of the second fuel gas chamber), then step c) of said method of combustion comprises supplying the fuel gas stream to the second fuel gas chamber via the second inlet and step d) of the method comprises:

d1) controlling the flow of the fuel gas stream supplied to the second fuel gas chamber via the second inlet, and d2) controlling the portion of said fuel gas stream flowing form said second fuel gas chamber to said first fuel gas chamber via the first inlet.

As also mentioned above, the second fuel gas chamber may at least partially and preferably wholly surround the first fuel gas chamber.

In an alternative embodiment of the method according to the invention, step c) of supplying a fuel gas stream to the fuel gas distributor comprises:

step c1) of supplying a first fuel gas stream to the first (131) inlet of the first fuel gas chamber (111); and step c2) of supplying a second fuel gas stream to the second inlet (132), whereas step d) of controlling the flow of the flue gas stream respectively to the first inlet and to the second inlet comprises:

step d1) of controlling the flow of the first fuel gas stream to the first inlet (131); and step d2) of controlling the flow of the second fuel gas stream to the second inlet (132).

Said method furthermore comprises the steps:

e1) of injecting the first fuel gas stream from the first fuel gas chamber (111) in the inner fuel-conducting passage (101) of the at least two fuel gas canals (110);

e2) of injecting the second fuel gas stream from the second fuel gas chamber (112) in the outer fuel-conducting passage (102) of the at least two fuel gas canals (110); and step f) of combusting the at least one injected oxidant stream and the at least two injected fuel gas streams in the combustion zone downstream of the burner assembly where the at least one injected oxidant stream and the at least two injected fuel gas streams intersect.

In that case, the burner assembly typically has a means for supplying a fuel gas stream comprising (a) means for supplying a first fuel gas stream to the first inlet of the first fuel gas chamber, and (b) means for supplying a second fuel gas stream to the second inlet of the second fuel gas chamber and a (c) fuel gas flow control means equipped to control the flow of the first fuel gas stream to the first inlet and to control the flow of the second fuel gas stream to the second inlet.

The first fuel-gas stream may consist of a low calorific value fuel gas and the second fuel gas stream of a high calorific fuel gas or vice-versa.

Advantageously, the first fuel gas stream consists of a low calorific value fuel gas, and the second fuel gas stream consists of a high calorific value fuel gas.

Preferably:

i) the fuel gas flow control means controls the flow of the first fuel gas stream from the means for supplying a first fuel gas stream to the first inlet, i.e. to the inlet of the first fuel gas chamber and therefrom to the inner fuel-conducting passages, so that the first fuel gas stream constitutes from 0 to 90% vol. of the at least two injected fuel gas streams, and ii) the fuel gas flow control means controls the flow of the second fuel gas stream from the means for supplying a second fuel gas stream to the second inlet, i.e. to the inlet of the second fuel gas chamber and therefrom to the outer fuel-conducting passages, so that the second fuel gas stream constitutes from 100 to 10% vol. of the at least two injected fuel gas streams.

According to a specific embodiment of this combustion process, the first fuel gas stream constitutes from 0 to 50% vol. of the at least two injected fuel gas streams, and the second fuel gas stream constitutes from 100 to 50% vol. of the at least two injected fuel gas streams. This latter embodiment is particularly useful when the burner assembly operates at a power of no more than its nominal power.

The first fuel gas stream advantageously leaves the inner fuel gas outlet with an injection velocity of from 5 m/s to 50 m/s.

The second fuel gas stream advantageously leaves the outer fuel gas outlet with an injection velocity of from 18 m/s to 30 m/s.

As mentioned before, such a burner assembly and the corresponding combustion process presents the major advantage of allowing the burner assembly/the combustion process and consequently also the furnace in which the burner assembly is mounted to use low calorific value fuel gas which may be available on site or at low cost. Low calorific value fuel gas may be difficult to ignite or cause flame instability, which may be of transitory nature, e.g. during start-up when the temperature in the furnace is low. The present invention makes it possible to overcome these problems through the injection of high calorific value fuel, temporarily (e.g. during start-up) on its own (i.e. without simultaneous injection of low calorific fuel) or with simultaneous injection of low calorific fuel (temporarily or continuously), and this simultaneously and evenly for the at least two fuel canals.

In burner assemblies according to this embodiment, the first fuel gas chamber is normally not in fluid connection with the second fuel gas chamber. The entire first fuel gas stream which is fed to the first fuel gas chamber thus normally flows into the inner fuel-conducting passages of the at least two fuel gas canals to be injected into the combustion zone, and the entire second fuel gas stream which is fed to the second fuel gas chamber flows into the outer fuel-conducting passages of the at least two fuel gas canals for its injection into the combustion zone.

The composition of the first fuel gas stream may be identical to or different from the composition of the second fuel gas stream. When the first and second fuel gas stream have different compositions, the overall composition of the fuel gas injected through the at least two fuel gas canals is simultaneously and evenly controlled by controlling, using the fuel gas flow control means, the ratio between the flow of the first fuel gas stream to the first fuel gas chamber and the flow of the second fuel gas stream to the second fuel gas chamber.

In particular, the fuel gas of the first fuel gas stream may have a higher or lower calorific value (also referred to as the LHV or Lower Heating Value) than the fuel gas of the second fuel gas stream. In particular, the fuel gas of the first fuel gas stream may be a fuel with a low calorific value and the fuel gas of the second fuel gas stream may be a fuel with a high calorific value or vice versa.

When the first and second fuel gas stream have different calorific values, the overall calorific value of the fuel gas injected through the at least two fuel gas canals is simultaneously and evenly controlled by controlling, using the fuel gas flow control means, the ratio between the flow of the first fuel gas stream to the first inlet and thus into the first fuel gas chamber and the flow of the second fuel gas stream to the second inlet and thus into second fuel gas chamber.

In the present context, a "fuel with a low calorific value" is understood to mean a fuel having a calorific value of less than 5 kWh/Nm$^3$ and a "fuel with a high calorific value" is understood to mean a fuel having a calorific value of at least 5 kWh/Nm$^3$. Examples of low calorific value fuels are some blast furnace gasses having, for example a calorific value of from 0.90 to 0.98 kWh/Nm$^{3'}$. An example of a high calorific value fuel is natural gas with a calorific value of about 10 kWh/Nm$^3$. (Normal cubic meter (Nm$^3$) corresponds to the quantity of gas occupying a volume of 1 m$^3$ in normal conditions (0° C. and 1 atm)).

Such a burner assembly and the corresponding combustion process and furnace not only provides for greater flexibility (wider range of process conditions), but also enables the valorisation in said furnace and combustion process of fuel with a low calorific value.

Indeed, whereas generally, variations in the calorific value of the fuel injected into a combustion zone may lead to significant variations in temperature, in temperature distribution and in flame stability, the burner assembly according to the invention and the corresponding combustion process and furnace is specifically adapted to provide better control of flame structure and therefore also of flame stability, of thermal energy release and of pollutant creation, such as NOx, and this for a wide range of fuel gases and of overall calorific values and variations in overall calorific value.

Flame stability can also be increased by injection of one or more auxiliary oxidant jets through or in the vicinity of the outlets of the at least two fuel injection canals. According to a preferred embodiment, auxiliary oxidant jets are injected into the combustion zone through or in the vicinity of the outlets of the at least two fuel canals, whereby said auxiliary oxidant jets surround the at least two injected fuel gas streams. It will be appreciated that such a measure for increasing flame stability can also be used in the earlier described first embodiment of the method according to the present invention.

When one or more auxiliary oxidant jets are injected, the injection velocity of said one or more auxiliary oxidant jets is advantageously from 1 m/s to 12 m/s, preferably 10 m/s±1 m/s, flame stability being thereby enhanced.

The use of a first and second fuel gas stream with different compositions, presents the major advantage of allowing the combustion method/the burner assembly and consequently the furnace in which the burner assembly is mounted to use low calorific value fuel gas which may be available on site or at low cost. Low calorific value fuel gas may be difficult to ignite or cause flame instability, which may be of transitory nature, e.g. during start-up when the temperature in the furnace is low. The present invention makes it possible to overcome these problems through the injection of high calorific value fuel, temporarily (e.g. during start-up) on its own (i.e. without simultaneous injection of low calorific fuel) or with simultaneous injection of low calorific fuel (temporarily or continuously), and this simultaneously and evenly for the at least two fuel canals.

BRIEF DESCRIPTION OF THE FIGURES

Embodiments and advantages of the present invention are illustrated in the examples hereafter, in which reference is made to the enclosed drawings.

I. GENERAL ASPECTS

DETAILED DESCRIPTION OF THE INVENTION

According to one aspect of the present invention, the combustion process and burner assembly therefor are provided which operate with low oxidant supply pressure, such as the pressure delivered by a vacuum swing adsorption oxygen production unit. Low oxidant pressure means a pressure ranging from 105,000 to 170,000 Pa (absolute pressure) (50 m bar to 0.7 bar/relative pressure).

According to the present invention, the fuel and the oxidant are introduced in the furnace through separate canals in the burner assembly. The term "fuel gas", according to this invention, means fuel in gaseous form, for example, methane, natural gas, propane or the like, at room temperature (approximately 25° C.) or in preheated form. The "oxidant" according to the present invention may be air. The oxidant preferably is a gas with an oxygen molar concentration of at least 50%. Such oxidants include oxygen-enriched air containing at least 50% vol. of oxygen, oxygen such as "industrially" pure oxygen (99.5%) produced by a cryogenic air separation plant or non-pure oxygen produced by e.g. a vacuum swing adsorption process (88% vol. O2 or more) or "impure" oxygen produced from air or any other source by filtration, adsorption, absorption, membrane separation, or the like, whereby the oxidant may be at room temperature or in preheated form.

When mounted for operation, the canals, as defined herein, normally pass through a ceramic block or block assembly or through a furnace wall. The canals preferably have a generally circular cross section. Any equivalent cross section can be used, such as square, rectangular, ellipsoid, oval, and the like. The canals and passages are advantageously made of tubular members can be placed in the ceramic block, block assembly or furnace wall to avoid or reduce damage to the latter Said tubular members can be metallic tubes, metallic tubes or pipes with ceramic ends, ceramic tubes, or a combination thereof. Examples of suitable ceramic materials for injector tubes include alumina, zirconia, yttria, silicon carbide, and the like. Various stainless steels may be used for the injectors if the injectors are metallic, and metallic injectors having heat-protective refractory coatings, employing materials such as those mentioned for ceramic injectors, are also possible.

The fuel gas injection is preferably made by at least two canals, preferably of substantially identical dimensions, which axes are located preferably in a same plane, further referred to as the first fuel plane. The fuel and oxidant outlets are physically separated and geometrically arranged in order to impart to the fuel fluid streams and the oxidant fluid streams angles and velocities that allow combustion of the fuel fluid with the oxidant in a stable, wide, and luminous flame in a combustion zone downstream of the burner assembly.

In preferred embodiments, the fuel canals diverge at an initial angle, and then this initial divergence angle increases slightly just before the fuel enters the combustion chamber to the final divergence angle. This final divergence angle is preferably only a few degrees larger than the first divergence angle. A preferred final angle between two adjacent fuel canals is between 3 and 10 degrees.

According to one preferred embodiment of the present invention, a process is provided wherein a "sheet" of fuel fluid is generated above the surface to be heated, e.g. by means of at least two fuel canals that make a final diverging angle preferably smaller than 15 degrees, said fuel canals being located in a first fuel plane, an oxidant fluid having a lower velocity than that of the fuel fluid (preferably not exceeding 60 meters per second (m/s) being injected above the surface to be heated, preferably with at least two oxidant canals, two adjacent oxidant canals making a final diverging angle smaller than 15 degrees. The axes of these oxidant canals are preferably located in a second oxidant plane, which converges to and intersects with the first fuel plane in the combustion chamber. The low velocity oxidant fluid jets which intersect with the fuel sheet, are dragged by the fuel flow along the fuel sheet, and create a combustion zone that stretches along the "sheet". Accordingly, at the beginning of the combustion zone of the combustion chamber, a fuel-rich region is maintained at the underside of the fuel cloud where significant amounts of soot are formed. The soot and the fuel are then progressively oxidized by the oxidant that diffuses along the combustion zone.

The total quantities of fuel and oxidant used by the combustion system are normally such that the flow of oxygen ranges from 0.95 to 1.05 of the theoretical stoichiometric flow of oxygen necessary to obtain the complete combustion of the fuel flow. Another expression of this statement is that the combustion ratio is between 0.95 and 1.05.

II. EXAMPLES

Figure 1:
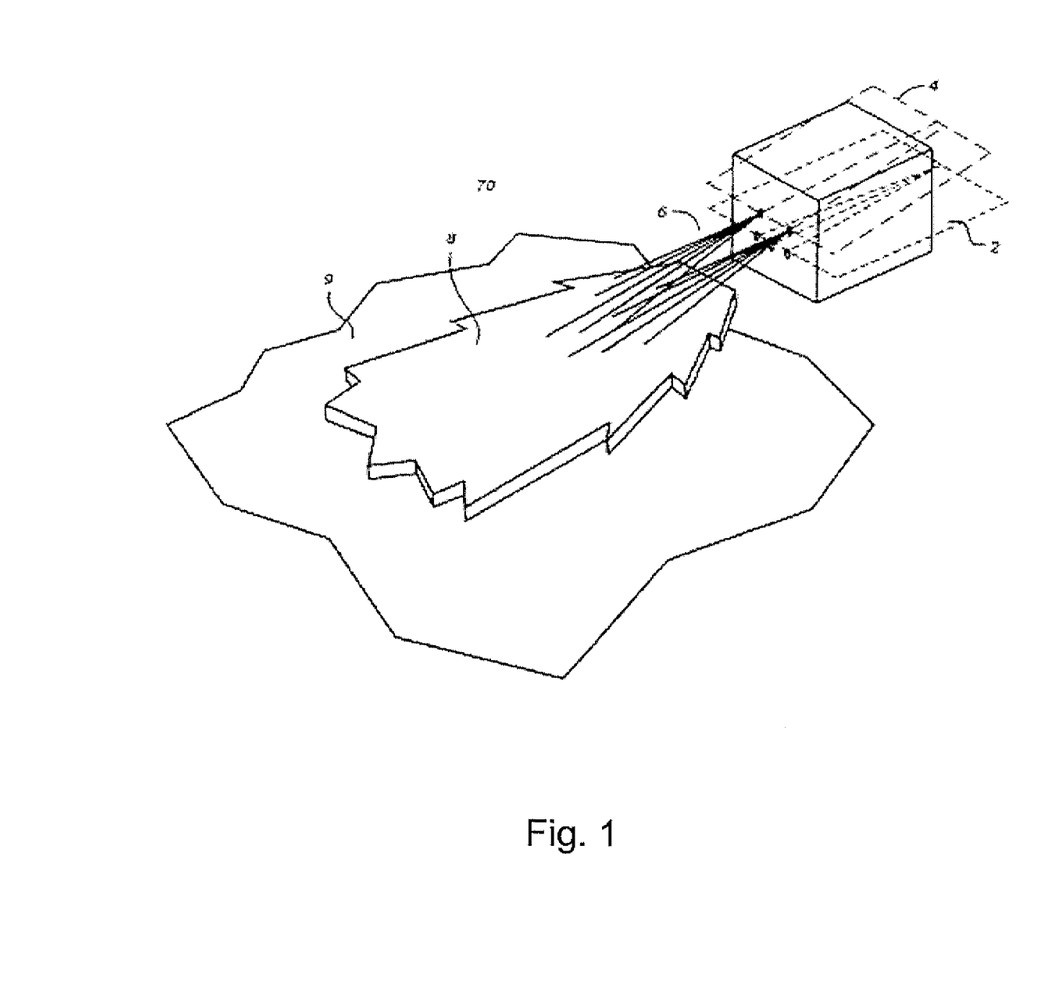
FIG. 1 is a schematic perspective view of the combustion of fuel gas and oxidant using a burner assembly according to the invention, whereby a fuel gas "sheet" is made by injecting fuel gas through three (3) fuel gas canals located in a first plane, and wherein the oxidant is injected through two (2) oxidant canals located in a second plane.

FIG. 1 represents a schematic perspective view of the combustion of fuel gas and an oxidant by means of a burner assembly according to the invention, as used in, for example, a glass melting tank A fuel gas "sheet" or "cloud" is formed by three injected fuel gas streams exiting the exit face of the burner assembly via the three (3) fuel gas canals in the first plane 2. Two (2) injected oxidant streams 6 exit the oxidant canals in the second plane 4, and intersect the fuel sheet in the combustion chamber 70 of the furnace.

Combustion of the fuel gas with the oxidant occurs at an interface between the two flows to generate a flame 8 above the melt 9. By spreading the fuel gas in a plane and creating planar layer or a "sheet" all over the melt substantially parallel to the melt and directing oxidant, and in particular oxygen from above into the direction of the "sheet" to intersect the "sheet", combustion occurs between the oxidant fluid and the fuel gas where they cross each other.

Such combustion process and its advantages are described in U.S. Pat. Nos. 5984667 and 6,068,468.

Figure 2:
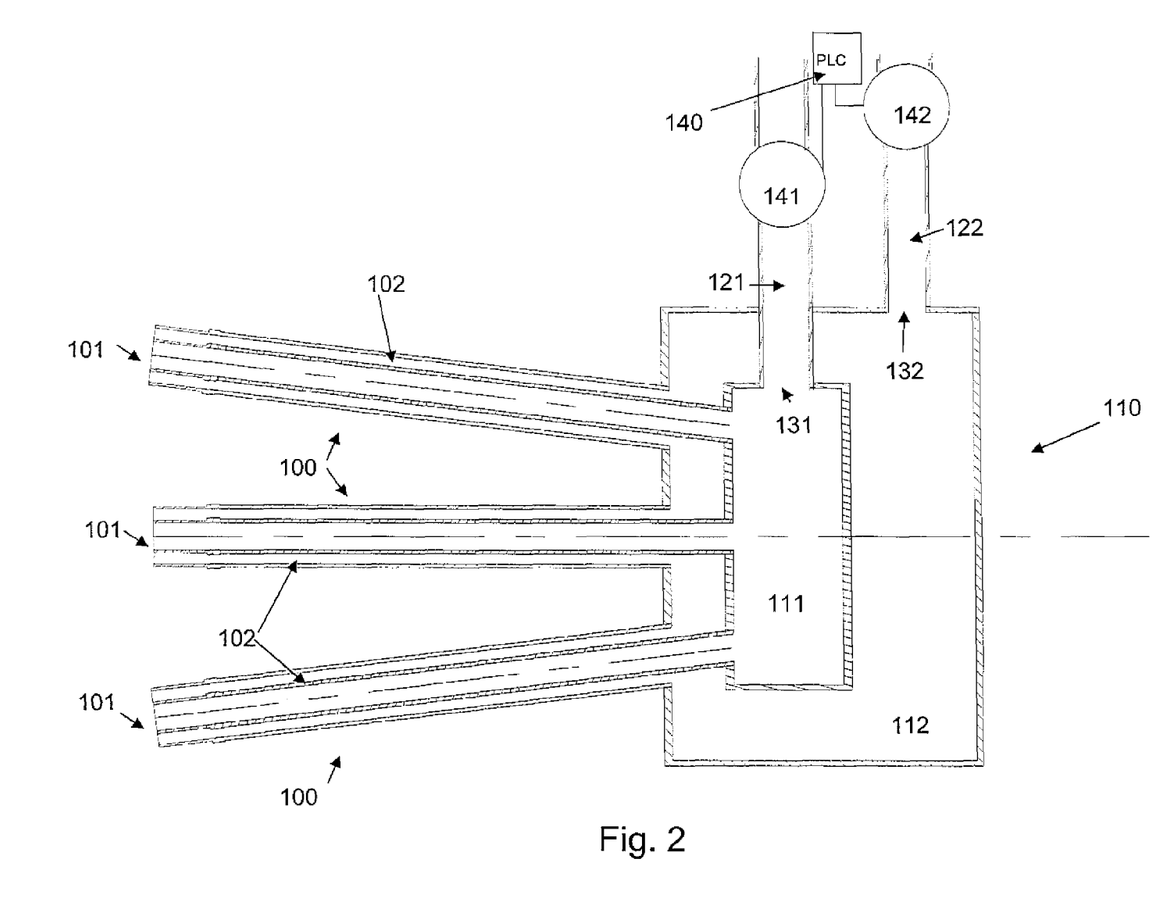
FIG. 2 is a schematic cross section across the fuel gas canals of a first embodiment of the burner assembly of FIG. 1, in which a first fuel gas stream is supplied to the first fuel gas chamber and a second fuel gas stream is supplied to the second fuel gas chamber.

FIG. 2 is a schematic cross section across the fuel gas canals (plane 2) of a first embodiment of the burner assembly of FIG. 1, in which a first fuel gas stream is supplied to the first fuel gas chamber and a second fuel gas stream is supplied to the second fuel gas chamber, As shown in FIG. 2, each of the three (3) fuel gas canals 100 comprise an inner fuel-conducting passage 101 forming an inner fuel gas outlet and a coaxial outer fuel-conducting passage 102 forming an outer fuel gas outlet.

The three fuel gas canals 100 are in fluid connection with the fuel gas distributor 110. The fuel gas distributor comprises a first fuel gas chamber 111 and a second fuel gas chamber 112. The means for supplying fuel gas to the fuel gas distributor comprises (1) a first supply line is supplied with fuel gas by means comprising a first supply line 121 which supplies a first fuel gas to the first fuel gas chamber 111 via first inlet 131 and (2) a second supply line 122 which supplies a second fuel gas to the second fuel gas chamber 112 via second inlet 132. A first flow controller 141 controls the flow of the first fuel gas from a first fuel source via the first supply line 121 and first inlet 131 to the first fuel gas chamber 111 and a second flow controller 142 controls the flow of the second fuel gas from a second fuel source via the second supply line 122 and second inlet 132 to the second fuel gas chamber 112. The two flow controllers 141, 142 are automatically operated by control unit 140. Each of the three inner fuel-conducting passages 101 is mounted on the first fuel gas chamber 111 and in fluid connection therewith. Likewise, each of the outer fuel-conducting passages 102 is mounted on the second fuel-gas chamber.112.

In operation, a flow of the first fuel gas, controlled by flow controller 141, is supplied to the first fuel gas chamber 111 and is distributed by said first fuel gas chamber 111 to the inner fuel-conducting passages 101 for its injection into the combustion zone downstream of the burner assembly. Likewise, a flow of the second fuel gas, controlled by flow controller 142, is supplied to the second fuel gas chamber 112 and is distributed by said second fuel gas chamber 112 to the outer fuel-conducting passages 102 for its injection into the combustion zone downstream of the burner assembly.

According to a particularly interesting mode of operation, the first fuel gas (hereafter: rich fuel gas) is a fuel gas with a high calorific value, such as natural gas and the second fuel gas (hereafter: poor fuel gas) is a fuel gas with a low calorific value, such as blast furnace gas.

By controlling the flow of rich and poor fuel gas to the burner assembly and thus to the combustion zone, the invention enables simultaneous and even control of the overall momentum and the overall calorific value of the fuel gas stream injected by each of the fuel gas canals.

For example, during start-up of the furnace, when the interior of the furnace is still at low temperature and ignition and flame stability is difficult to achieve, flow controllers 141 and 142 are operated so that mainly or only rich fuel gas flows into the fuel gas distributor and from the distributor into the combustion zone. As the interior of the furnace heats up, and ignition and flame stability becomes easier, flow controllers 141 and 142 are operated so as to increase the ratio of poor fuel gas over rich fuel gas flowing into the fuel gas distributor, whereby, depending on the conditions in the combustion zone, the burner assembly may be operated with only poor fuel gas. It will be appreciated that it is possible, at any moment, to increase the ratio of rich fuel gas over poor fuel gas, if required. The present invention thus makes it possible to valorise poor fuel gases simply and reliably.

For increased flame stability, the burner assembly may be equipped to inject an auxiliary oxidant gas in the vicinity of each injected fuel gas stream, for example surrounding each fuel gas stream.

The present invention also makes it possible to simply and reliably control the overall momentum of the fuel gas stream injected through each of the fuel gas canals when a single source of fuel gas is used.

Figure 3:
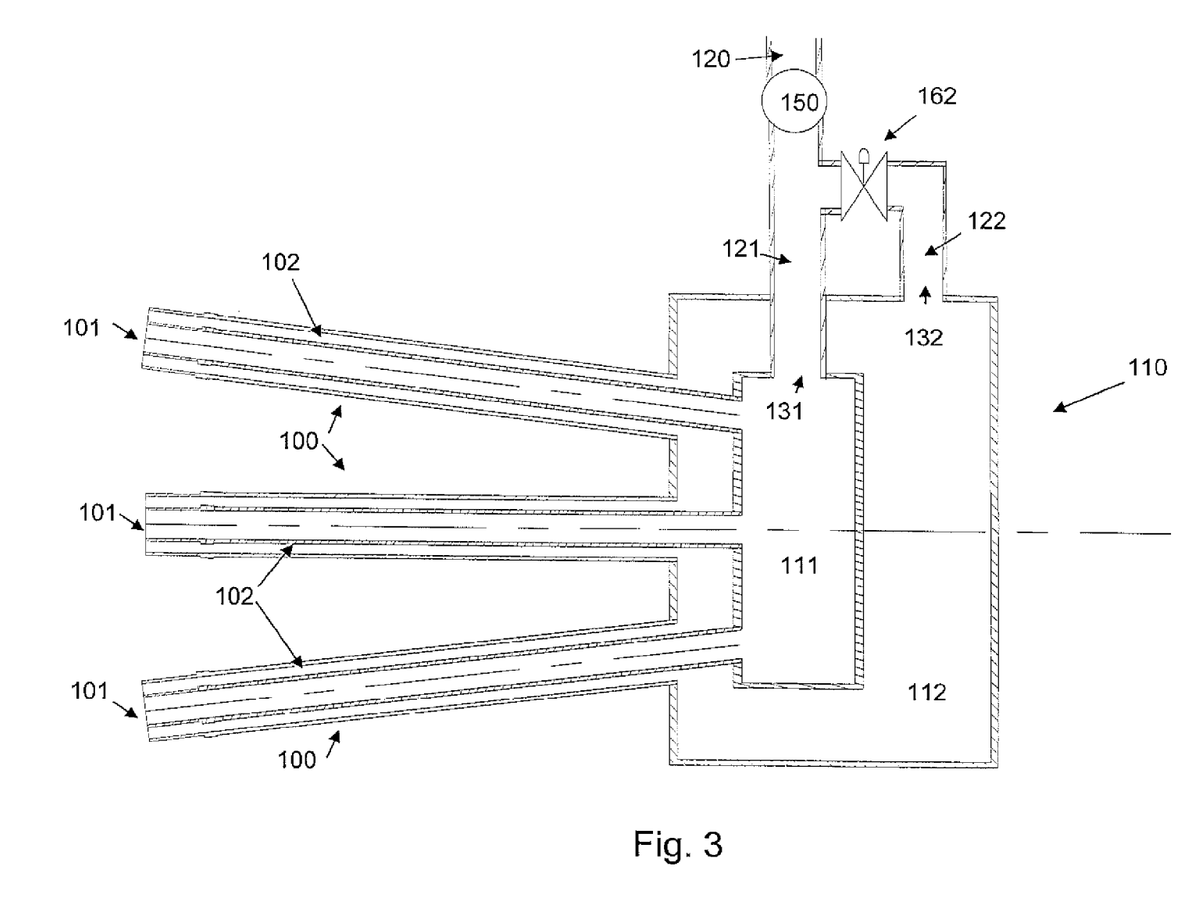
FIG. 3 is a schematic cross section across the fuel gas canals of a second embodiment of the burner assembly of FIG. 1, in which the fuel gas stream supplied to the fuel gas distributor is split into a first fuel gas stream which is fed to the first chamber and a second fuel gas stream which is fed to the second fuel gas chamber.

FIG. 3 represents is a schematic cross section across the fuel gas canals of a second embodiment of the burner assembly of FIG. 1, in which the fuel gas stream supplied to the fuel gas distributor is split into a first fuel gas stream which is fed to the first chamber and a second fuel gas stream which is fed to the second fuel gas chamber, As shown in FIG. 3, the means for supplying fuel gas to the fuel gas distributor comprises a supply line 120. Flow controller 150 controls the flow of fuel gas from a fuel gas source (not shown) to the fuel gas distributor 110 via supply line 120. Downstream of flow controller 150, supply line 120 is split into (1) a first supply branch which supplies fuel gas to the first fuel gas chamber 111 via first inlet 131 and (2) a second supply branch 122 which supplies fuel gas to the second fuel gas chamber 112 via second inlet 132. Valve 162, which in the illustrated embodiment is mounted on the second supply branch controls the portion of the fuel gas supplied by supply line 120 which flows into the second supply branch 122 and from said second supply branch to the second fuel gas chamber 112 via second inlet 132. In the illustrated embodiment, valve 162 is manually operated, but an automatic valve is also possible. Likewise, a valve may be mounted on the first supply branch instead of on the second supply branch, or on both branches.

In operation, the portion of the fuel gas which is supplied to the first fuel gas chamber 111 via first supply branch 121 is distributed by said first fuel gas chamber 111 to the inner fuel-conducting passages 101 for its injection into the combustion zone downstream of the burner assembly. Likewise, the portion of the fuel gas which is supplied to the second fuel gas chamber 112 via second supply branch 122 and is distributed by said second fuel gas chamber 112 to the outer fuel-conducting passages 102 for its injection into the combustion zone downstream of the burner assembly.

By controlling the flow of fuel gas to respectively the first and second fuel gas chamber, the invention enables, for a given fuel gas supply stream, simultaneous and even control of the overall momentum of the fuel gas stream injected by each of the fuel gas canals.

Figure 4:
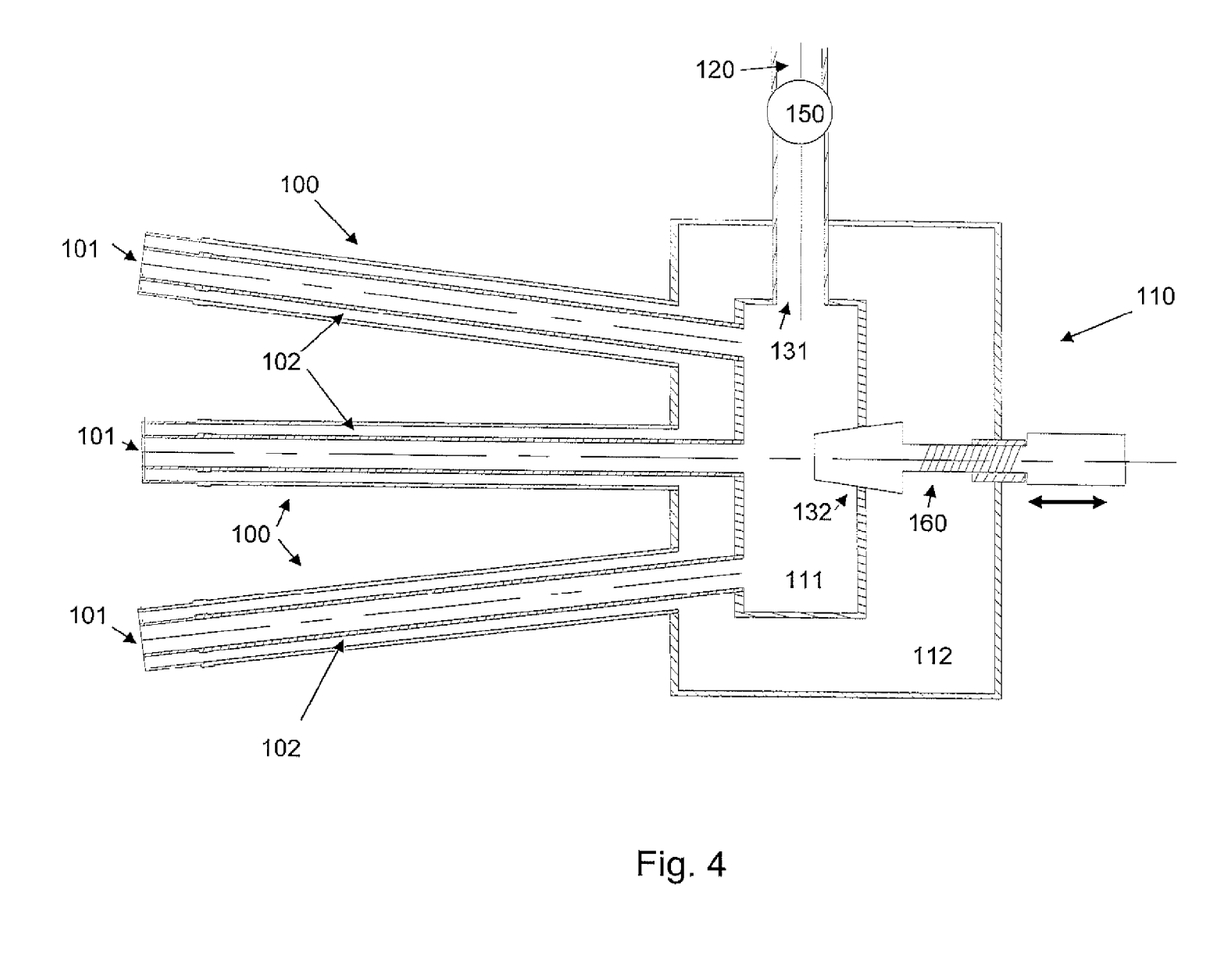
FIG. 4 is a schematic cross section across the fuel gas canals of a further embodiment of the burner assembly of FIG. 1, in which the fuel gas stream supplied to the fuel gas distributor is supplied to one of the fuel gas chambers and in which a controlled portion of the fuel gas stream thus supplied to said fuel gas chamber may be allowed to pass into the second fuel gas chamber.
Figure 5:
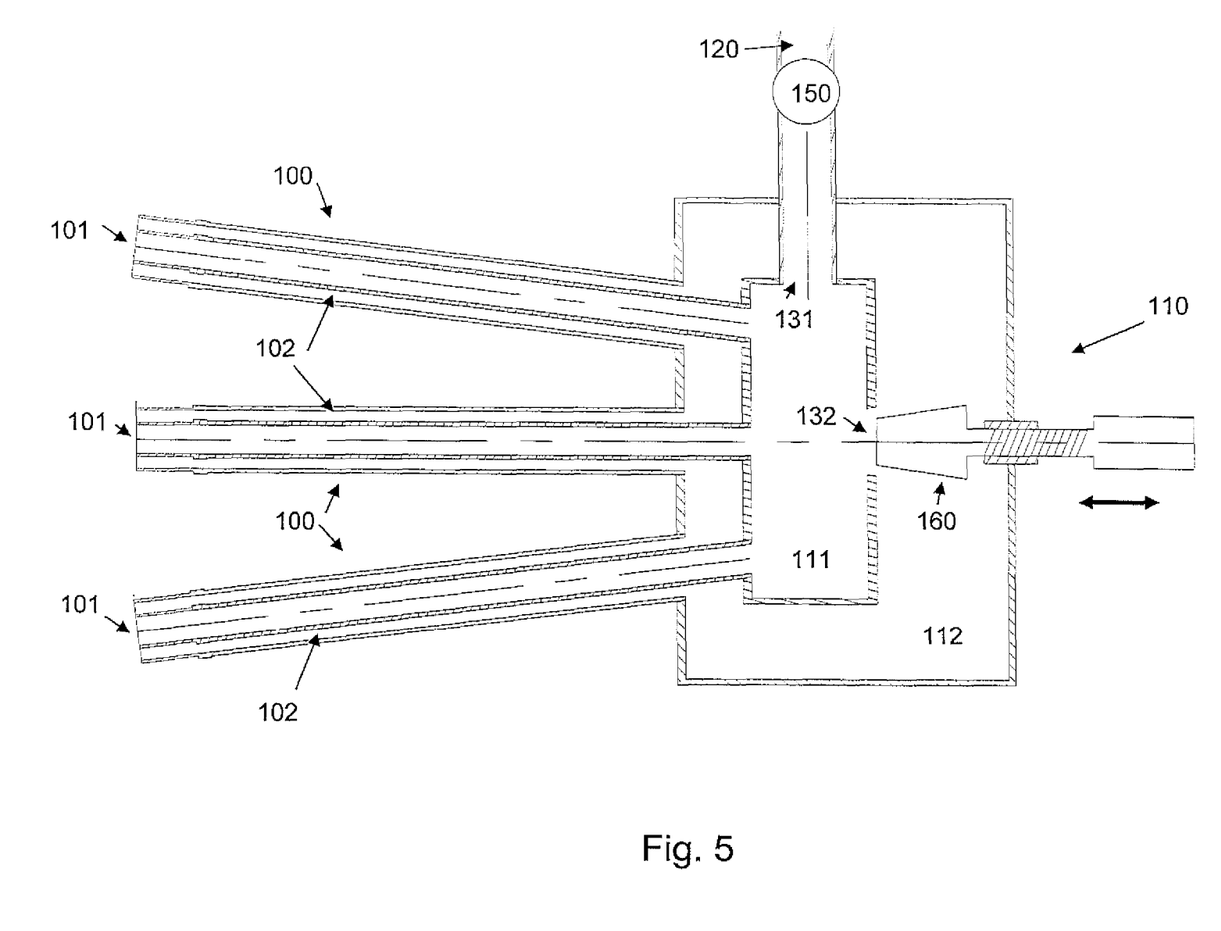
FIG. 5 is a schematic cross section across the fuel gas canals of an another embodiment of the burner assembly of FIG. 1, in which the fuel gas stream supplied to the fuel gas distributor is supplied to one of the fuel gas chambers and in which a controlled portion of the fuel gas stream thus supplied to said fuel gas chamber may be allowed to pass into the second fuel gas chamber.

FIG. 4 and FIG. 5 are schematic cross sections across the fuel gas canals of a further embodiment of the burner assembly of FIG. 1, in which the fuel gas stream supplied to the fuel gas distributor is supplied to one of the fuel gas chambers and in which a controlled portion of the fuel gas stream thus supplied to said fuel gas chamber may be allowed to pass into the second fuel gas chamber.

In the illustrated embodiment, supply line 120 supplies fuel gas to the first fuel gas chamber 111 via first inlet 131. The second inlet 132 connects first fuel gas chamber 111 to second fuel gas chamber. Said second inlet 132 functions as a valve seat for manually operated valve or stopper 160. When, as shown in FIG. 4, valve 160 entirely closes of the second inlet 132, the entire fuel gas stream supplied by supply line 120 to first fuel gas chamber 111 is injected into the combustion zone via the inner fuel-conducting passages 101 of the fuel gas canals 100. When, on the other hand, valve 160 does not close off second inlet 132 or, as shown in FIG. 5, does not entirely close off second inlet 132, a controlled part of the fuel gas stream supplied to the first fuel gas chamber 111 bleeds into the second fuel gas chamber 112 via second inlet 132 and is thereafter injected into the combustion zone via the outer fuel-conducting passages 102 of the fuel gas canals.

Figure 6:
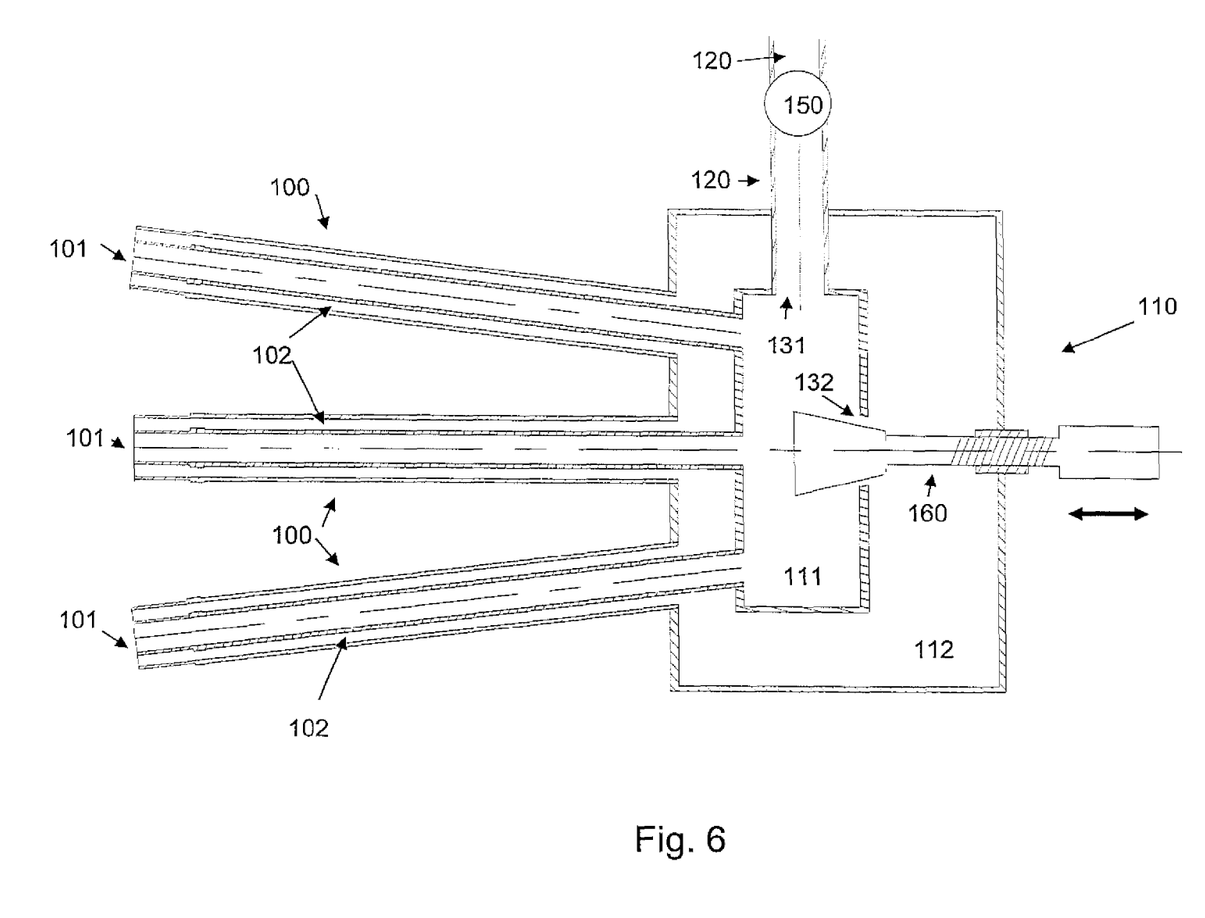
FIG. 6 is a schematic cross section across the fuel gas canals of still another embodiment of the burner assembly of FIG. 1, in which the fuel gas stream supplied to the fuel gas distributor is supplied to one of the fuel gas chambers and in which a controlled portion of the fuel gas stream thus supplied to said fuel gas chamber may be allowed to pass into the second fuel gas chamber.

An alternative form of valve 160 is shown in FIG. 6.

Figure 7:
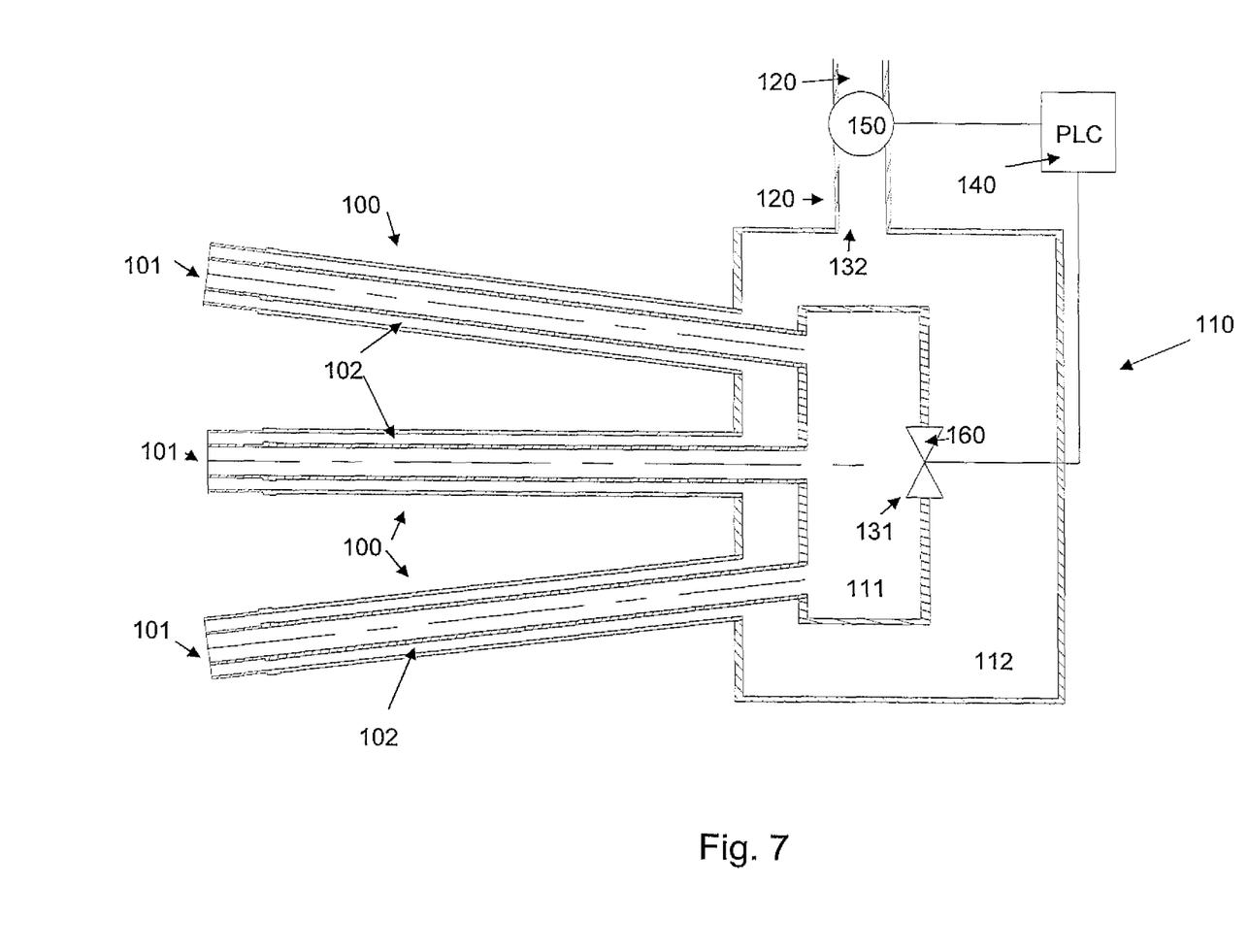
FIG. 7 is a schematic cross section across the fuel gas canals of yet another embodiment of the burner assembly of FIG. 1, in which the fuel gas stream supplied to the fuel gas distributor is supplied to one of the fuel gas chambers and in which a controlled portion of the fuel gas stream thus supplied to said fuel gas chamber may be allowed to pass into the second fuel gas chamber.

As shown in FIG. 7, an automatically operated valve 160 may also be used to open or close the inlet which connects the two fuel gas chambers. In the illustrated embodiment, supply line 120 supplies fuel gas to the second fuel gas chamber 112 via second inlet 132. The first inlet 131 connects second fuel gas chamber 112 to second fuel gas chamber. Automatic valve 160 is mounted in said first inlet 131. When, valve 160 entirely closes of the first inlet 131, the entire fuel gas stream supplied by supply line 120 to second fuel gas chamber 112 is injected into the combustion zone via the outer fuel-conducting passages 102 of the fuel gas canals 100. When, on the other hand, valve 160 does not close off first inlet 131 or does not entirely close off first inlet 131, a controlled part of the fuel gas stream supplied to the second fuel gas chamber 112 bleeds into the first fuel gas chamber 111 via first inlet 131 and is thereafter injected into the combustion zone via the inner fuel-conducting passages 101 of the fuel gas canals. In the illustrated embodiment, the same control unit commands flow controller 150 and valve 160.

By controlling the flow of fuel gas to one of the first and second fuel gas chambers and by controlling the flow of fuel gas from said fuel gas chamber to the other fuel gas chamber, the invention enables, for a given fuel gas supply stream, simultaneous and even control of the overall momentum of the fuel gas stream injected by each of the fuel gas canals.

Major advantages of the present invention are its ease of operation and the fact that the required moving parts of the burner assembly are situated away from the combustion zone and are therefore protected from the deleterious effects of the atmosphere and temperatures inside said combustion zone.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A burner assembly comprising:
   at least two fuel gas canals comprising an inner fuel-conducting passage forming an inner fuel gas outlet and an outer fuel-conducting passage forming an outer fuel gas outlet, said inner and said outer fuel-conducting passages being coaxially arranged;
   at least one oxidant canal; and
   at least one exit face at which terminate the at least two fuel gas canals or at least one of the at least one oxidant canal, wherein the at least two fuel gas canals and the at least one oxidant can being configured such that a direction of injection of oxidant from the at least one oxidant canal substantially converges and intersects at a combustion zone downstream of the burner assembly with a direction of injection of fuel gas from the at least two fuel gas canals,
   an oxidant supply line;
   an oxidant injection device adapted to inject said oxidant stream in said at least one oxidant fluid canal to create at least one injected oxidant stream;
   a fuel gas supply device adapted to supply a fuel gas stream;
   a fuel gas injection device comprising a fuel gas distributor adapted to receiving the fuel gas stream from the fuel gas supply device, said fuel gas injection device being adapted to inject said fuel gas stream in said at least two fuel gas canals to create at least two injected fuel gas streams, the fuel gas distributor comprising:
      a first fuel gas chamber in fluid connection with the inner fuel-conducting passage, said first fuel gas chamber having a first inlet;
      a second fuel gas chamber in fluid connection with the outer fuel-conducting passage, said second fuel gas chamber having a second inlet; and
   a fuel gas flow controller, wherein:
      one of the first and second inlets receives a portion of the fuel gas stream supplied by the fuel gas supply device and the other of the first and second inlets provides fuel gas fluid communication between the first and second fuel gas chambers, and
      the fuel gas flow controller is adapted to control a portion of the fuel gas stream flowing from one of the fuel gas chambers to the other of the fuel gas chambers via the other of the first and second inlets.

2. A burner assembly comprising:
   at least two fuel gas canals comprising an inner fuel-conducting passage forming an inner fuel gas outlet and an outer fuel-conducting passage forming an outer fuel gas outlet, said inner and said outer fuel-conducting passages being coaxially arranged;
   at least one oxidant canal; and
   at least one exit face at which terminate the at least two fuel gas canals or at least one of the at least one oxidant canal, wherein the at least two fuel gas canals and the at least one oxidant can being configured such that a direction of injection of oxidant from the at least one oxidant canal substantially converges and intersects at a combustion zone downstream of the burner assembly with a direction of injection of fuel gas from the at least two fuel gas canals,
   an oxidant supply line;
   an oxidant injection device adapted to inject said oxidant stream in said at least one oxidant fluid canal to create at least one injected oxidant stream;
   a fuel gas supply device adapted to supply a fuel gas stream;
   a fuel gas injection device comprising a fuel gas distributor adapted to receiving the fuel gas stream from the fuel gas supply device, said fuel gas injection device being adapted to inject said fuel gas stream in said at least two fuel gas canals to create at least two injected fuel gas streams, the fuel gas distributor comprising:
      a first fuel gas chamber in fluid connection with the inner fuel-conducting passage, said first fuel gas chamber having a first inlet;
      a second fuel gas chamber in fluid connection with the outer fuel-conducting passage, said second fuel gas chamber having a second inlet; and
   a fuel gas flow controller, wherein the fuel gas supply device supplies the fuel gas stream to the first inlet and the fuel gas flow controller is adapted to control a portion of the fuel gas stream flowing from the first chamber into the second chamber via the second inlet.

3. A burner assembly comprising:
   at least two fuel gas canals comprising an inner fuel-conducting passage forming an inner fuel gas outlet and an outer fuel-conducting passage forming an outer fuel gas outlet, said inner and said outer fuel-conducting passages being coaxially arranged;
   at least one oxidant canal; and
   at least one exit face at which terminate the at least two fuel gas canals or at least one of the at least one oxidant canal, wherein the at least two fuel gas canals and the at least one oxidant can being configured such that a direction of injection of oxidant from the at least one oxidant canal substantially converges and intersects at a combustion zone downstream of the burner assembly with a direction of injection of fuel gas from the at least two fuel gas canals,
   an oxidant supply line;
   an oxidant injection device adapted to inject said oxidant stream in said at least one oxidant fluid canal to create at least one injected oxidant stream;
   a fuel gas supply device adapted to supply a fuel gas stream;
   a fuel gas injection device comprising a fuel gas distributor adapted to receiving the fuel gas stream from the fuel gas supply device, said fuel gas injection device being adapted to inject said fuel gas stream in said at least two fuel gas canals to create at least two injected fuel gas streams, the fuel gas distributor comprising:
      a first fuel gas chamber in fluid connection with the inner fuel-conducting passage, said first fuel gas chamber having a first inlet;
      a second fuel gas chamber in fluid connection with the outer fuel-conducting passage, said second fuel gas chamber having a second inlet; and
   a fuel gas flow controller, wherein the gas supply device supplies the fuel gas stream to the second inlet and the fuel gas flow controller is adapted to control a portion of the fuel gas stream flowing from the second chamber into the first chamber via the first inlet.

4. A furnace comprising the burner assembly of claim 1.

5. The furnace of claim 4, wherein the furnace is a melting furnace.

6. A method of combusting a fuel gas with an oxidant using the burner assembly of claim 1, said method comprising the steps of:
- supplying an oxidant stream with the oxidant supply line;
- injecting said oxidant stream in the at least one oxidant fluid canal to create at least one injected oxidant stream;
- supplying a fuel gas stream from the fuel gas supply device to the fuel gas distributor;
- supplying the fuel gas stream from the fuel gas distributor to one of the first and second fuel gas chambers via the associated fuel gas chamber inlet of that one of the first and second fuel gas chambers;
- controlling a flow of the fuel gas stream to said one of the first and second gas fuel chambers via the associated fuel gas chamber inlet of said one of the first and second gas fuel chambers;
- controlling a portion of said fuel gas stream flowing from said one of the first and second fuel gas chambers to the other of the first and second fuel gas chambers via the associated inlet of said other of the first and second fuel gas chambers;
- injecting said fuel gas stream in said at least two fuel gas canals to create at least two injected fuel gas streams; and
- combusting the at least one injected oxidant stream and the at least two injected fuel gas streams in the combustion zone downstream of the burner assembly where the at least one injected oxidant stream and the at least two injected fuel gas streams intersect.

7. The method of claim 6, wherein:
- the fuel gas stream from the fuel gas distributor is supplied to the first fuel gas chamber via the inlet of the first gas chamber;
- the fuel gas stream flows from the first fuel gas chamber to the second fuel gas chamber via the inlet of the second fuel gas chamber; and
- the flow of the fuel gas stream from to the first fuel gas chamber to the second fuel gas chamber is controlled.

8. The method of claim 6, wherein:
- the fuel gas stream from the fuel gas distributor is supplied to the second fuel gas chamber via the inlet of the second gas chamber;
- the fuel gas stream flows from the second fuel gas chamber to the first fuel gas chamber via the inlet of the first fuel gas chamber; and
- the flow of the fuel gas stream from to the second fuel gas chamber to the first fuel gas chamber is controlled.

9. The method of claim 6, wherein the oxidant has an oxygen molar concentration of at least 50.

10. The method of claim 6, wherein an auxiliary oxidant jet is injected through or in the vicinity of the outlets of the at least two fuel injection canals.

11. The method of claim 10, wherein said auxiliary oxidant jets surround the at least two injected fuel gas streams.

12. The method of claim 6, wherein the oxidant has an oxygen molar concentration of at least 80%.

13. The method of claim 6, wherein the oxidant has an oxygen molar concentration of at least 90%.

* * * * *